(12) United States Patent
Whatmough

(10) Patent No.: US 6,467,552 B1
(45) Date of Patent: Oct. 22, 2002

(54) LAND LEVELLING DEVICE

(76) Inventor: Harry Ross Whatmough, Tangewhine Valley Road, RD 2, Dargeville (NZ)

( * ) Notice: Subject to any disclaimer, the term of this patent is extended or adjusted under 35 U.S.C. 154(b) by 0 days.

(21) Appl. No.: 09/874,782

(22) Filed: Jun. 5, 2001

(51) Int. Cl.[7] .................. A01B 59/043; E02F 3/76
(52) U.S. Cl. ........................... 172/445.1; 172/501
(58) Field of Search .................. 172/449, 605, 172/439, 445.1, 501, 503, 684.5, 777, 448, 502, 299, 824–826, 239, 197, 199, 145; 403/3, 4

(56) References Cited

U.S. PATENT DOCUMENTS

| | | | | |
|---|---|---|---|---|
| 4,196,778 A | * | 4/1980 | Smith | 172/199 |
| 4,217,962 A | * | 8/1980 | Schaefer | 172/197 |
| 4,655,297 A | * | 4/1987 | Bourgeois, Jr. | 172/445.1 |
| 4,815,542 A | * | 3/1989 | DePlazes | 172/253 |
| 4,869,326 A | * | 9/1989 | Hutchins et al. | 172/197 |
| 5,172,499 A | * | 12/1992 | Griffin | 37/403 |
| 5,397,200 A | * | 3/1995 | Seal | 404/118 |
| 5,511,625 A | * | 4/1996 | Mork | 172/445.1 |
| 5,806,605 A | * | 9/1998 | Keigley | 172/145 |

* cited by examiner

Primary Examiner—Robert E. Pezzuto
(74) Attorney, Agent, or Firm—Hovey Williams LLP

(57) ABSTRACT

Preferably the land levelling device (1) includes a support frame (2) on which is mounted a front, transversely extending, blade (3), a rear, transversely extending, blade (4), and a coupler (5) for, in use, attaching the land levelling device to a towing vehicle (30), the support frame (2) mounting the front and rear blades (3, 4) in substantially parallel spaced apart relationship wherein the front blade (3) has a cutting edge (9) projecting foremost, and a cutting face (10) angled backwardly and upwardly from the cutting edge (9) toward the support frame (2), and wherein the rear blade (4) has a lower edge (13) which lies below, or at least co-planar with, the cutting edge (9) of the front blade (3), the construction and arrangement of the front and rear blades (3, 4) being such that in use mounds or bumps in the ground are sheared off by the front blade (3) and pass over it to be redistributed into hollows in the ground by the rear blade (4).

17 Claims, 2 Drawing Sheets

LAND LEVELLING DEVICE

FIELD OF THE INVENTION

This invention relates to an improved land levelling device.

BACKGROUND ART

Farms in particular have a need for flat, or smooth land. The reasons for this are many-fold, but include vehicular access, animal safety and the like. Devices are known for use in land levelling, but such devices have, to date, been crude and inefficient.

Land levelling devices are typically employed in clearing and levelling drain tailings, repairing pugged land, reducing hillside cattle ruts, repairing farm tracks, and in the cultivation and contouring of land.

Objects of the present invention are to provide an improved land levelling device that, when towed behind a tractor or other towing vehicle, can improve the flatness of a land surface by removing material from high spots and relocating it in low spots, or at least to provide the public with a useful choice.

SUMMARY OF THE INVENTION

The present invention broadly provides a land levelling device including a front transverse blade, a rear transverse blade, a coupling means for attaching the levelling device to the three-point linkage of a towing vehicle in use, and a joining means which joins together said front blade and said rear blade wherein said front blade has a bottom blade edge and a front surface that slopes upwardly and rearwardly from said bottom blade edge, and said rear blade has a lower edge which lies substantially in a common plane with said bottom edge of said front blade, the construction and arrangement being such that in use mounds or bumps in the ground are sheared off by the front blade and pass over it to be redistributed into hollows by the rear blade. Preferably the land levelling device includes a support frame on which is mounted a front, transversely extending, blade, a rear, transversely extending, blade, and a coupling means for, in use, attaching the land levelling device to a towing vehicle, the support frame mounting the front and rear blades in substantially parallel spaced apart relationship wherein said front blade has a cutting edge projecting foremost, and a cutting face angled backwardly and upwardly from the cutting edge toward the support frame, and wherein said rear blade has a lower edge which lies below, or at least co-planar with, the cutting edge of the front blade, the construction and arrangement of the front and rear blades being such that in use mounds or bumps in the ground are sheared off by the front blade and pass over it to be redistributed into hollows in the ground by the rear blade.

As used herein the terms "earth", "ground" and "land" are intended to include reference to gravel, organic or inorganic waste material, or any other material intended to be spread over an area.

Conveniently the front blade is oriented at an angle of between 20 degrees and 50 degrees from the horizontal upwardly and rearwardly away from the cutting edge.

Preferably the front blade is configured and arranged to provide a ramped surface so that, in use, earth cut by the cutting edge is separated from the ground beneath and is lifted up the ramped surface by the forward motion of the land levelling device and dumped in front of the oncoming rear blade.

Optionally the cutting edge of the front blade and the lower edge of the rear blade are co-planar. However, and more desirably, the lower edge of the rear blade projects downwardly of the support frame beyond the cutting edge of the front blade.

Desirably the land levelling device further includes a levelling plate mounted from the bottom edge of the rear blade. Preferably the land levelling device further includes a rear wall upstanding from the rear blade to, in use, trap earth cut by the front blade and hold it available for redistribution by the levelling plate of the rear blade.

Desirably the land levelling device further includes upstanding side walls extending between the corresponding ends of the front and rear blades, the side walls being attached, one at each end, to the rear wall.

Preferably the coupling means is configured and arranged to enable, in use, attachment of the land levelling device to a three-point linkage of a towing vehicle.

BRIEF DESCRIPTION OF THE DRAWINGS

A preferred form of the invention will now be described, by way of example only, with reference to the accompanying drawings, in which.

DETAILED DESCRIPTION OF THE DRAWINGS

Figure 1:
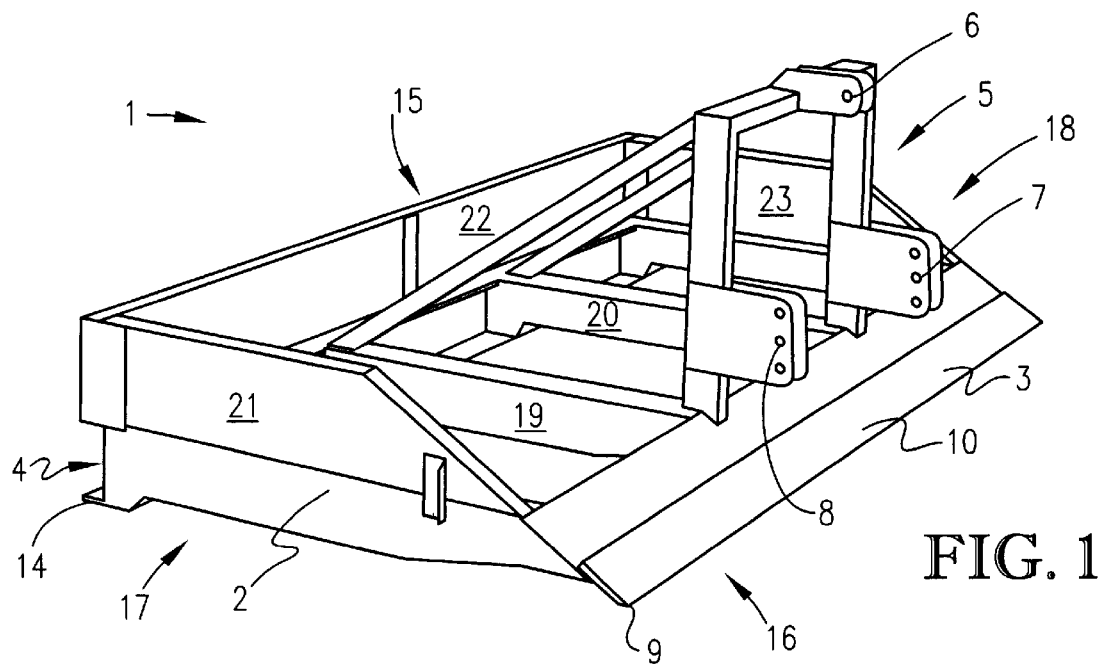
FIG. 1 shows a perspective view as seen from in front and to the right side of a preferred embodiment of a land levelling device according to the present invention.

FIG. 1 shows a land levelling device, generally indicated at 1, which includes a support frame 2 on which is mounted a front, transversely extending, blade 3, a rear, transversely extending, blade 4, and a coupler. The blades 3,4 extend transversely across the width of the device 1.

Figure 3:
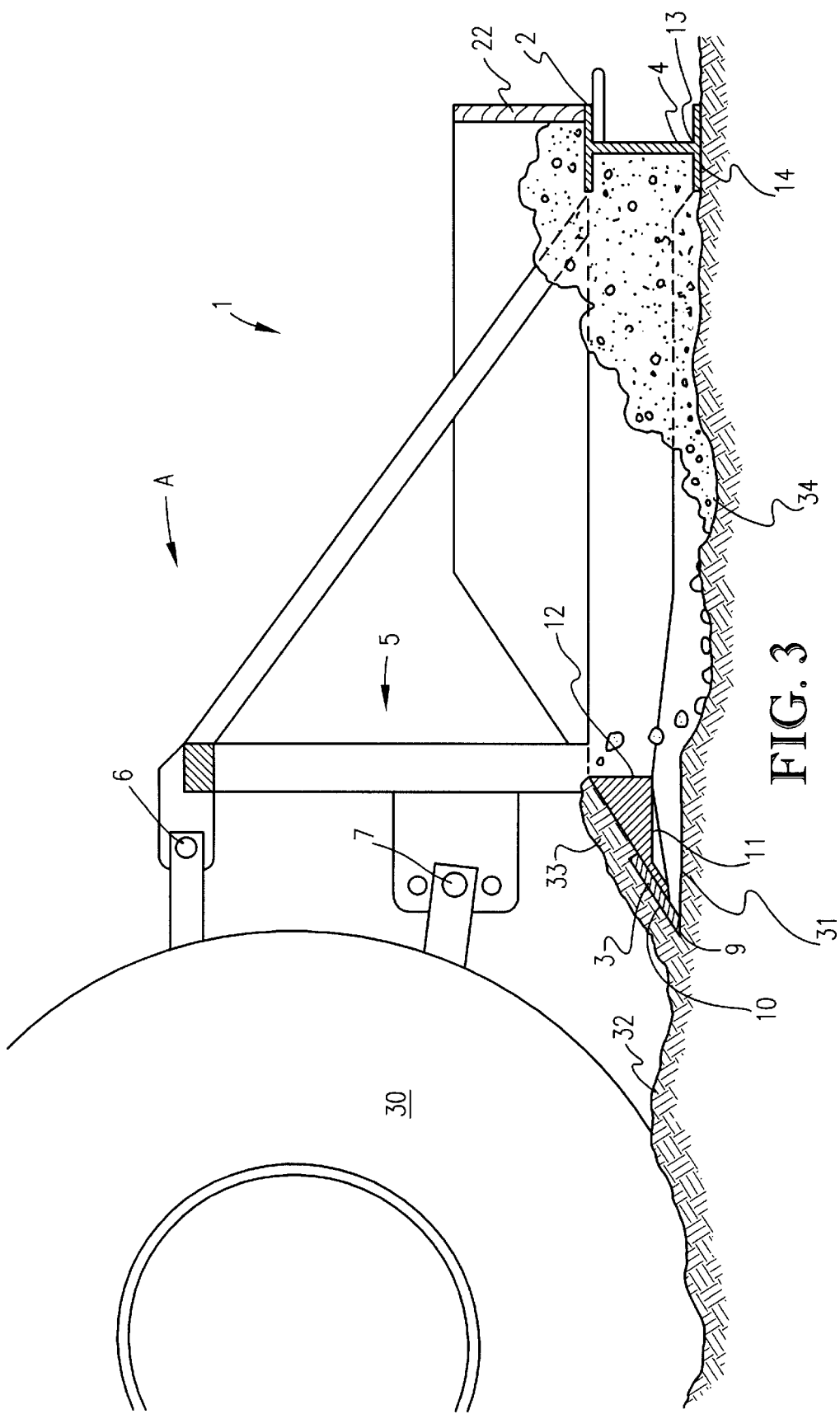
FIG. 3 shows a cross-sectional side view demonstrating the operation of the preferred embodiment shown in FIG. 1.

In use, the device 1 is towed behind a vehicle such as a tractor, as partially shown in FIG. 3 and indicated at 30. The device 1 is attached to tractor 30 by way of a standard three-point linkage mounted off the tractor 30. Attachment of the device 1 is via the coupler 5, preferably having three coupling points 6, 7 and 8 which correspond to the three linkage points of the tractor 30. The coupling points 6,7,8 are preferably located above the front surface of the front blade 3.

Figure 2:
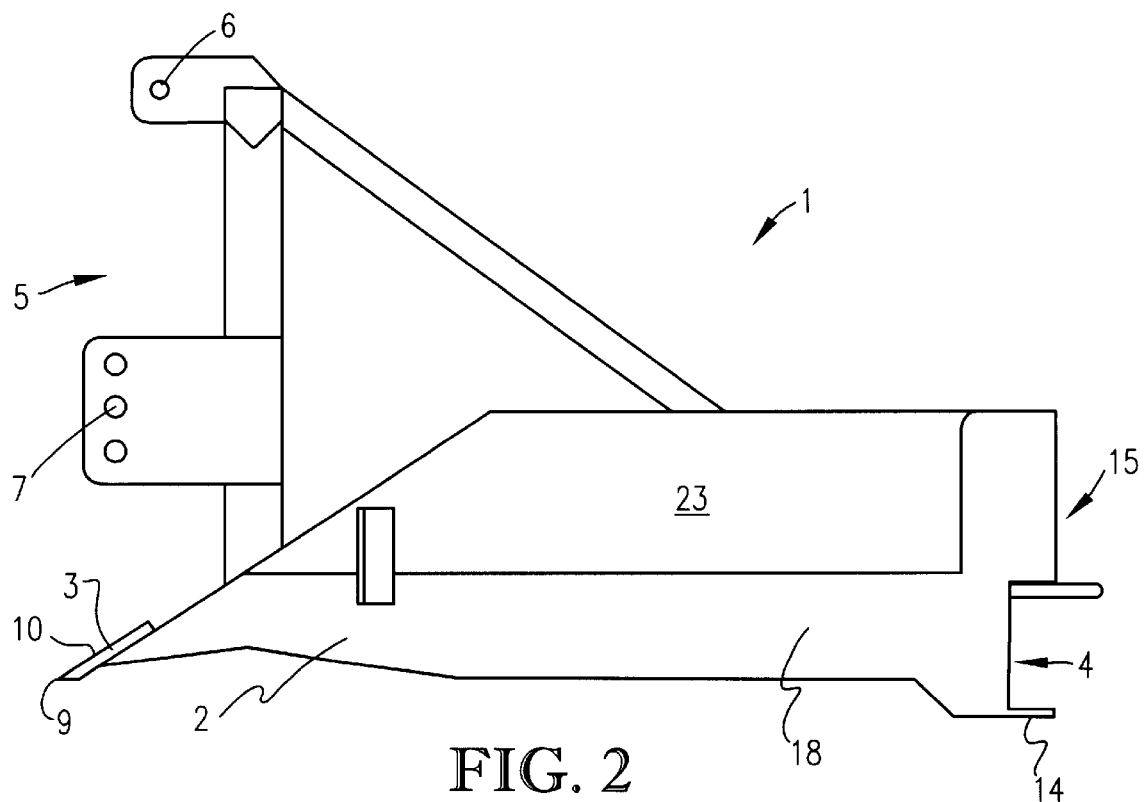
FIG. 2 shows a side view of the preferred embodiment shown in FIG. 1.

The front blade has a cutting edge 9, and a cutting face 10. The cutting edge 9 may be sharpened to shear through high spots in any ground it contacts in use. The cutting face 10 slopes upwardly and rearwardly towards the frame 2 from the cutting edge 9 at an angle of between twenty and fifty degrees, optimally at an angle of thirty degrees. The cutting face 10 is preferably a smooth surface to allow material cut by the cutting edge 9 to move freely up and over the blade 3. Optionally the cutting face 10 of the front blade 3 may be flat, as shown in FIG. 1 and in the cross-sectional side view of FIG. 2, however, and alternatively, it is within the contemplation of the invention that the front blade be curved.

The front blade 3 is preferably releasably attached to the frame 2. Any known attachment means, such as bolts, machine screws or the like may be used. Alternatively the blade 3 may be attached in a more permanent fashion, such as by welding.

The frame 2 adjacent the mounting position of the blade 3 is preferably strengthened and shaped to correctly orient the blade 3. In that regard the frame 2 may include strengthening members such as webs 11 and 12.

In the arrangement shown in the figures, web 11 is substantially horizontal and web 12 is substantially vertical. As best seen in the cross-sectional side view shown in FIG. 3, the web 11 may be offset above the level of the cutting edge 9 of the front blade 3 so that it does not drag on the surface 31 of the ground newly exposed by the cutting action of the front blade 3.

The front blade 3 may extend across the width of the levelling device 1 in a straight line, as seen in FIG. 1. Alternatively, it may be curved or V-shaped. If the blade is curved or V-shaped its ends may be located forward of its middle portion so that soil material removed by the blade is urged up and over the upper edge of the blade rather than being directed outwardly around the ends of the blade, i.e. at the sides of the levelling device, as the levelling device is advanced across the ground.

The rear blade 4 has a lower edge 13. The cutting edge 9 of the front blade 3 is preferably maintained, in use, in a plane slightly above the lower edge 13 of the rear blade 4, although the plane of the cutting edge 9 and the plane of the lower edge 13 are preferably parallel if both blades are straight, as seen in the embodiment shown in figures.

Attached to the lower edge of the rear blade 4 is preferably, although not essentially, a levelling plate 14. This levelling plate 14 is configured and arranged, as shown in the drawings, to present a substantially planar lower surface to the ground which, in use, can skid across the surface of the ground at the rear end of the levelling device 1 and provide a degree of depth control apart from the three-point linkage attachment to the tractor 30.

The frame 2 is preferably rectangular in shape, having a rear wall 15 which, in the embodiment illustrated in the drawings comprises the rear blade 4, a front wall 16, on which the front blade 3 is mounted, and side walls 17, 18 reflecting the frame 2's function of providing rigid separation of the blades 3,4. The frame 2 may include strengthening members 19, 20 extending between the front and rear blade mounting positions, further enhancing rigidity.

Upstanding from the rear wall 15 and the side walls 17, 18 can be provided wall extensions 21,22,23 whose purpose is to provide a further barrier to earth or other material passing up over the blade 3 passing over the rear blade 4, rather than under the levelling plate 14.

In use, the levelling device 1 is attached to a rear three-point coupling on a tractor 30 or other towing vehicle.

The levelling device 1 is towed behind the towing vehicle 30 and passed across the general surface of the ground so that in areas where the front blade 3 engages a high spot, i.e. where the ground is above the general ground level, the blade 3 slices into and removes material. This may be more clearly understood by referring to FIG. 3 which shows a cross-sectional side view of the levelling device 1 in use.

The levelling device is advanced across the surface 31 of the ground in the direction of arrow A. In areas, such as high spot 32, where the immediate ground level is above the general ground level, the cutting edge 9 of the front blade 1 slices into and removes material. Material 33 loosened in this way slides up the cutting face 10 of the blade 3 and falls into the space 34 behind the front blade 3.

As the levelling device 1 is advanced across the ground, loosened material 35 in front of the rear blade 4 is dragged by the rear blade 4 across the ground. The slicing and lifting action of the front blade 3 and the dragging action of the rear blade 4 breaks up the loosened ground material. The broken material is dragged ahead of the rear blade 4. At low spots, i.e. areas where the immediate ground level is lower than the general ground level, the broken material falls into these areas to at least partially fill them. Excess material above the level of the lower edge 13 of the rear blade continues to be dragged onward by the rear blade 4.

Uneven ground may be treated by one or more passes of the levelling device 1 to reduce the unevenness, by relocating material removed from high spots to at least partially fill low spots.

Preferably the towing vehicle 30 has provision for adjusting the height of the three-point linkage coupling so that the height of the cutting edge 9 of the front blade 3 may be set to cut and remove material above a desired level.

It is thus seen that the present invention provides a simple and effective advancement in the art.

Where in the foregoing description reference has been made to integers or components having known equivalents then such equivalents are herein incorporated as if individually set forth.

Accordingly, it will be appreciated that changes may be made to the above described embodiments of the invention without departing from the principles taught herein.

Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

What is claimed is:

1. A land levelling device comprising:

a support frame;

a front, transversely extending blade mounted to the support frame;

a rear, transversely extending blade mounted to the support frame; and a coupler adapted for attaching the land levelling device to a towing vehicle., wherein the support frame mounts the front and rear blades in substantially parallel spaced apart relationship, wherein said front blade has a cutting edge projecting foremost, and a cutting face angled backwardly and upwardly from the cutting edge toward the support frame, and wherein said rear blade has a lower edge not extending above a substantially horizontal plane defined by the cutting edge of the front blade, the construction and arrangement of the front and rear blades being such that in use mounds or bumps in the ground are sheared off by the front blade and pass over it to be redistributed into hollows in the ground by the rear blade.

2. A land levelling device according to claim 1 wherein the front blade is oriented at an angle of between 20 degrees and 50 degrees from the horizontal upwardly and rearwardly away from the cutting edge.

3. A land levelling device according to claim 2 wherein the front blade is oriented at an angle of 30 degrees from the horizontal upwardly and rearwardly away from the cutting edge.

4. A land levelling device according to claim 1, wherein the front blade is configured and arranged to provide a ramped surface so that, in use, earth cut by the cutting edge is separated from the ground beneath and is lifted up the ramped surface by the forward motion of the land levelling device and dumped in front of the oncoming rear blade.

5. A land levelling device according to claim 1, wherein the cutting edge of the front blade and the lower edge of the rear blade are co-planar.

6. A land levelling device according to claim 1, wherein the lower edge of the rear blade projects downwardly of the support frame beyond the cutting edge of the front blade.

7. A land levelling device according to claim 1, wherein the land levelling device further includes a levelling plate mounted from the bottom edge of the rear blade.

8. A land levelling device according to claim 1, wherein the land levelling device further includes a rear wall upstanding from the rear blade to, in use, trap earth cut by the front blade and hold it available for redistribution by the levelling plate of the rear blade.

9. A land levelling device according to claim 8, wherein the land levelling device further includes upstanding side walls extending between the corresponding ends of the front and rear blades, the side walls being attached, one at each end, to the rear wall.

10. A land levelling device according to claim 1, wherein the coupler is configured and arranged to enable, in use, attachment of the land levelling device to a three-point linkage of a towing vehicle.

11. A land levelling device according to claim 3, wherein the front blade is configured and arranged to provide a ramped surface so that, in use, earth cut by the cutting edge is separated from the ground beneath and is lifted up the ramped surface by the forward motion of the land levelling device and dumped in front of the oncoming rear blade.

12. A land levelling device according to claim 11, wherein the cutting edge of the front blade and the lower edge of the rear blade are co-planar.

13. A land levelling device according to claim 12, wherein the lower edge of the rear blade projects downwardly of the support frame beyond the cutting edge of the front blade.

14. A land levelling device according to claim 13, wherein the land levelling device further includes a levelling plate mounted from the bottom edge of the rear blade.

15. A land levelling device according to claim 14, wherein the land levelling device further includes a rear wall upstanding from the rear blade to, in use, trap earth cut by the front blade and hold it available for redistribution by the levelling plate of the rear blade.

16. A land levelling device according to claim 15, wherein the land levelling device further includes upstanding side walls extending between the corresponding ends of the front and rear blades, the side walls being attached, one at each end, to the rear wall.

17. A land levelling device according to claim 1, wherein the coupler is configured and arranged to enable, in use, attachment of the land levelling device to a three-point linkage of a towing vehicle.

* * * * *